(12) United States Patent
Dunford et al.

(10) Patent No.: US 8,274,349 B2
(45) Date of Patent: Sep. 25, 2012

(54) VOLTAGE REGULATION SYSTEM

(75) Inventors: Albert W. Dunford, Vancouver (CA);
William G. Dunford, Vancouver (CA);
Colm E. Gallen, Vancouver (CA);
Daniel J. Harvey, Langley (CA)

(73) Assignee: LPSI (Barbados) Ltd., Bridgetown (BB)

( * ) Notice: Subject to any disclaimer, the term of this patent is extended or adjusted under 35 U.S.C. 154(b) by 0 days.

(21) Appl. No.: 12/992,934

(22) PCT Filed: May 16, 2008

(86) PCT No.: PCT/CA2008/000950
§ 371 (c)(1),
(2), (4) Date: Feb. 2, 2011

(87) PCT Pub. No.: WO2009/137908
PCT Pub. Date: Nov. 19, 2009

(65) Prior Publication Data
US 2011/0121796 A1 May 26, 2011

(51) Int. Cl.
*H01F 30/12* (2006.01)
(52) U.S. Cl. ..................................................... 336/12
(58) Field of Classification Search ................ 336/5, 12, 336/180–184, 90, 92; 323/210, 255, 355, 323/361
See application file for complete search history.

(56) References Cited

U.S. PATENT DOCUMENTS

| 3,599,040 A | | 8/1971 | Ebersohl et al. |
| 4,020,438 A | * | 4/1977 | Manimalethu ..................... 336/5 |
| 4,231,074 A | * | 10/1980 | McNutt et al. .................. 361/44 |
| 5,900,723 A | * | 5/1999 | Rostron ........................ 323/210 |
| 6,066,945 A | | 5/2000 | Shimazu et al. |
| 6,137,277 A | | 10/2000 | Rajda et al. |
| 7,692,523 B2 | * | 4/2010 | Colmenero et al. ............. 336/5 |

* cited by examiner

*Primary Examiner* — Tuyen Nguyen
(74) *Attorney, Agent, or Firm* — LaRiviere, Grubman & Payne, LLP

(57) ABSTRACT

A tap-switching autotransformer for regulating the voltage supplied to a facility includes an electronics sub-assembly for controlling switching of the taps. The electronics sub-assembly and the windings are contained in a housing from which the electronics sub-assembly may be removed for repair or replacement. The electronics sub-assembly is adapted to enable an electronically actuated switch to short-circuit two of the taps. A mechanical switch enables a separate short-circuit to be maintained between the taps to enable the electronics sub-assembly to be safely removed from the housing.

4 Claims, 5 Drawing Sheets

VOLTAGE REGULATION SYSTEM

FIELD OF THE INVENTION

This invention relates to voltage regulation systems. In particular, this invention relates to systems associated with a facility that regulate the incoming voltage from a power utility for delivery to the facility.

BACKGROUND OF THE INVENTION

Although power utilities supply line power to customers of the utilities at a nominal voltage, the actual line voltage varies about the nominal value. Over a large number of customer facilities, the occasional overvoltage represents a significant increase in consumption to the utility. It is therefore known to provide a voltage regulation system associated with a facility that tracks the line voltage from the utility and automatically steps the voltage down to maintain the power supplied to the facility at a voltage value that is closer to the nominal target value.

For example, U.S. Pat. No. 6,066,945 discloses an electric power saving transformer for three-phase current with an automatic voltage transferring device. The device automatically adjusts an output voltage within a predetermined range even when an input voltage is increased or decreased beyond a predetermined range.

The AVR-Harmonizer, offered by Legend Power Systems Inc. of Burnaby, British Columbia, is an autotransformer having a series of taps on the secondary enabling the adjusting of the output voltage of the transformer. The AVR-Harmonizer is placed in series with the line power supply to a building such that on-the-fly selection of individual taps regulates the voltage supplied to the building to within a narrower range than is typically supplied by the power utility. The tap selection is automatically implemented electronically.

Whenever any part of the device is to be replaced, it is necessary to interrupt the supply of power to the facility, resulting in considerable inconvenience if done frequently. The magnetic components of a regulator such as the windings can typically be expected to last 30 years before requiring replacement. On the other hand, the electronic package might require replacement every 10 years or so, and repair or replacement of components from time to time.

It is known to provide line power conditioning and power back-up equipment (particularly UPS's) that include a manual bypass switch to enable the removal and maintenance of the equipment or components thereof. It is also known to provide such systems in conjunction with step-wise tap switching regulators. Examples of this approach are disclosed or discussed in the following publications:

http://news.thomasnet.com/fullstory/539029
http://www.trafficcontrolcorp.com/Product%20Cuts/
  Tech%20Power_ME%20XL.pdf
http://books.google.ca/
  books?id=kb7BJNwt6fcC&pg=PA376&lpg=PA376&
  dq=%22manual+bypass+
  switch%22&source=web&ots=5BdG-
  GC_Vl&sig=DZHbd_zfMJWFZabs57qmlEaVAT0&
  hl=en
http://books.google.ca/
  books?id=qyHOFnUfCQMC&pg=PA817&lpg=PA
  817&dq=%22manual+bypass+switch %22+removal+
  conditioner&source=web&ots=TmKXm4t8d9&sig=
  YnZCcp7XNai_gZBRj2dSJbjV8oM&hl=en
http://www.solidstatecontrolsinc.com/techhpapers/pa-
  pers/upsindustrial.html Such approaches allow removal of the UPS from the lines without requiring interruption of the power supply to the facility.

SUMMARY OF THE INVENTION

The invention provides for the disabling of an automatically controlled multi-tap autotransformer-style voltage regulator interposed between a utility power supply and a facility without interrupting power to the facility.

One object of the invention is to allow the electronics of the regulator to be entirely removed from the transformer windings portion of the device allowing them to be repaired, maintained or tested as may be necessary. According to a first aspect of the invention, an electronics package is provided in a separable module that is capable of being disengaged from the magnetic components. The electronics package includes the electronic control elements that enable the tap switches to implement different turn ratios on the secondary windings.

According to the invention, a housing for the regulator includes means for releasably retaining the electronics package in a circuit with the magnetic components. Such means may comprise mounting the electronics package on guides in the housing from which the package can be removed by sliding it along the guides.

In an autotransformer style of regulator, opening all of the taps effectively open-circuits the secondary winding. If that were done in anticipation of disconnecting the taps and their associated control electronics from the windings for repair, maintenance or replacement, the open-circuited secondary would oversaturate the core, as has been described in relation to other types of transformers in U.S. Pat. Nos. 863,163, 1,531,611 and 4,521,822.

Accordingly, in a second aspect of the invention, this problem is overcome by establishing an effective short-circuit path between the input to the primary winding (i.e. the power mains) and the regulator output that supplies power to the facility. Oversaturation of the core is prevented by electronically actuating a short-circuit between two of the taps (for each phase) so as to produce a local current in the portion of the secondary winding that is reflected back to the primary and prevents saturation of the core. The result is an effective short-circuit path between the mains and the output of the regulator (i.e. the input to the facility). All of the taps may then safely be opened without undue consequences from effectively open-circuiting the secondary. The short-circuiting of two of the taps may be implemented through a built-in electronic tap shorting switch that is provided as part of the electronics package.

In the scenario as described thus far, the electronics package containing the taps and their control electronics can still not be removed as this would still open circuit the secondary with the undesirable consequences that entails. Therefore in accordance with a third aspect of the invention, a set of auxiliary mechanical bypass switches are associated with the regulator to short pairs of taps (one pair for each phase) by establishing short-circuits that are separate from the electronically-actuated short-circuit enabled by the separable electronics package. Thus the short-circuit across pairs of taps to the secondary is maintained despite the removal of the electronics package. This ensures that the effective short-circuit between the mains power input and the regulator output/facility input remains intact, while also avoiding any open-circuit condition for the secondary winding.

Other aspects of the invention will be appreciated by the detailed description that follows as well as by the claims that are to be considered as part of this disclosure and description.

BRIEF DESCRIPTION OF THE DRAWINGS

The invention will be more fully appreciated by reference to the detailed description of the preferred and other embodiments thereof in conjunction with the drawings in which.

DETAILED DESCRIPTION OF THE PREFERRED AND ALTERNATIVE EMBODIMENTS

Figure 1:
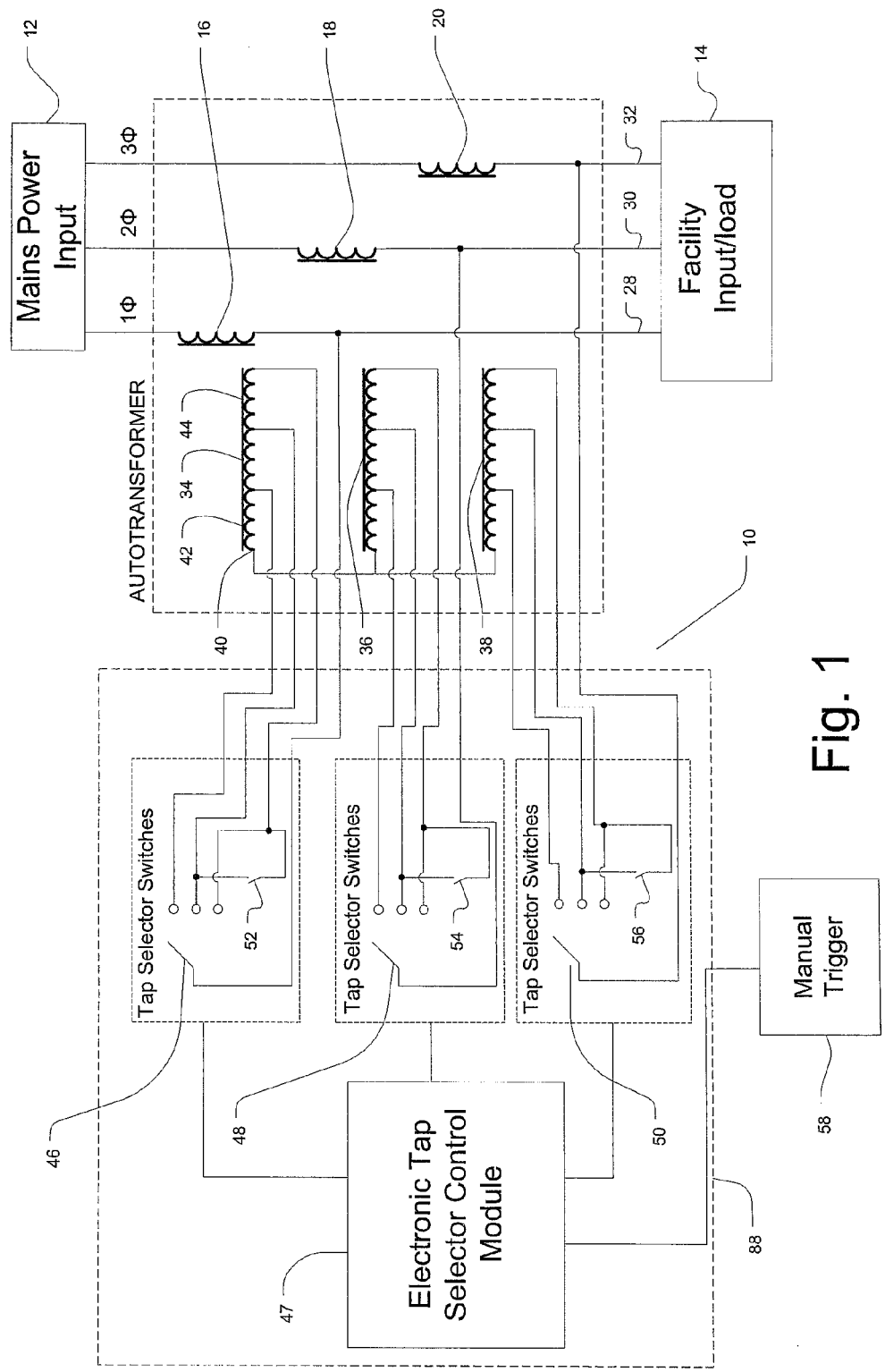
FIG. 1 is a circuit diagram of an autotransformer style multi-tap voltage regulator as contemplated in accordance with the preferred embodiment of the invention.

FIG. 1 illustrates the basic electrical and magnetic structure of an autotransformer-style of multi-tap voltage regulator 10, interposed between three-phase power mains 12 and the input 14 to a customer facility.

Primary windings 16, 18, 20 are connected between the mains power three phase inputs 1Φ, 2Φ, 3Φ and the facility three phase inputs 28, 30, 32. Secondary windings 34, 36, 38 each include three taps 40, 42, 44 (only labeled for winding 34). Electronic switches 46, 48 and 50 are electronically controlled by control module 47 to connect selected taps to the output side of the primary windings. Each tap represents an effective voltage drop of 6%, 4% or 2% in the preferred embodiment. Although each of tap selector switches 46, 48 and 50 is illustrated in FIG. 1 as a single switch, each selector switches will more likely be implemented as several switches with appropriate timing control.

Electronic bypass switches 52, 54, 56 are provided for selectively short-circuiting across two of the taps of each secondary winding thereby enabling a local current path across a portion of the secondary winding to prevent saturation of the core when none of the taps are selected. The electronic bypass switches are controlled by control module 47 which takes its cue for the actuation of the bypass switches from a manual trigger 58.

Figure 2:
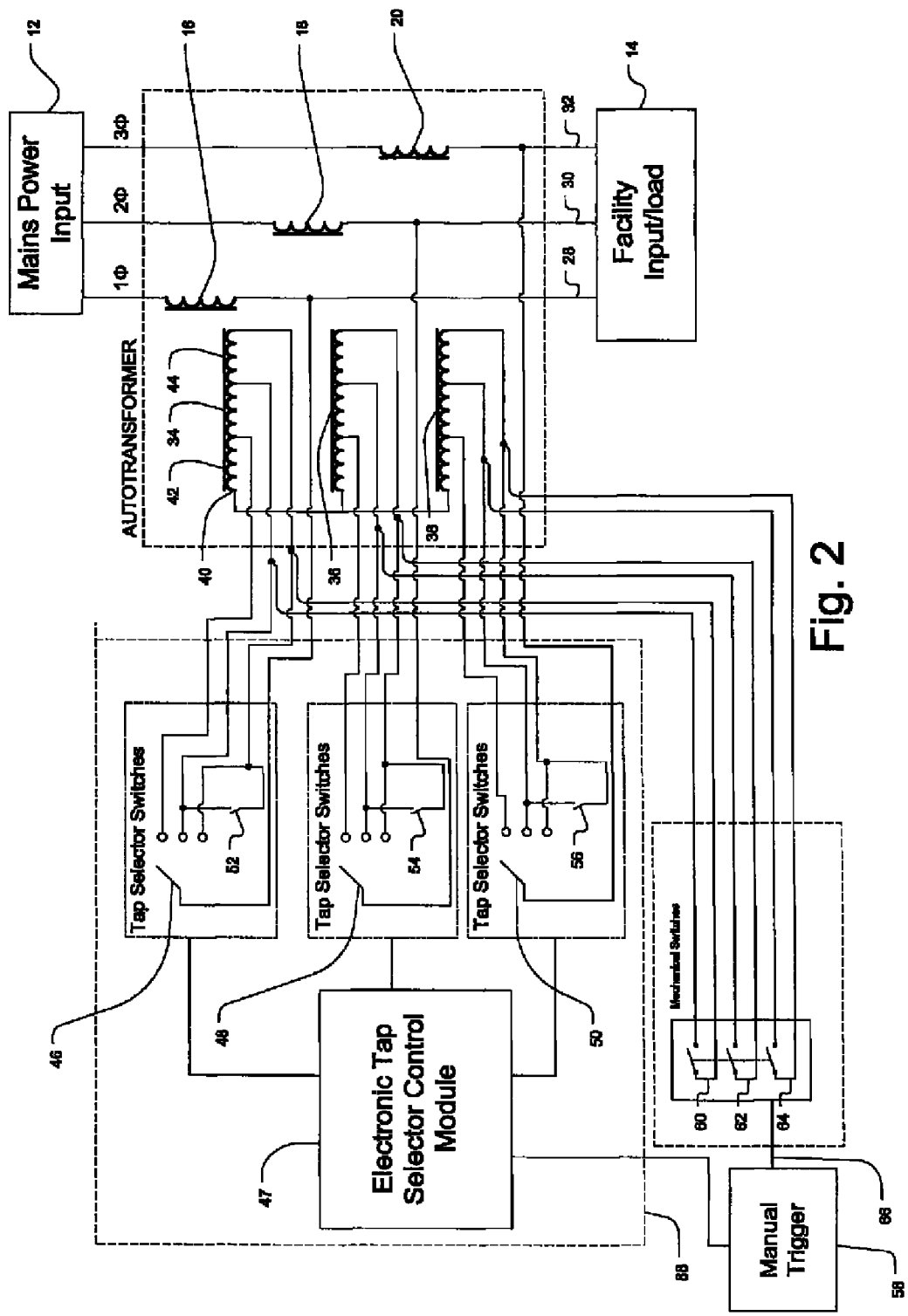
FIG. 2 is a circuit diagram showing the circuit of FIG. 1 and further including auxiliary mechanical bypass switches in accordance with the preferred embodiment.

Referring now to FIG. 2, there is shown the circuit of FIG. 1 but further including a representation of the auxiliary mechanical bypass switches 60, 62, 64 that may be manually or electronically activated. Where electronic actuation of the mechanical switches is desired, such actuation is preferably triggered by a manual key trigger 58 that compels control module 47 to first engage the electronic bypass switches 52, 54, 56, then closes mechanical bypass switches 60, 62, 64 via control line 66. While a separate control module might be provided in order to segregate the auxiliary mechanical switch control function from the normal regulator tap electronic switch control function, the same control module 47 is used in a preferred embodiment in order to coordinate the actuation of the electronic bypass switches 52, 54, 56 prior to engaging the mechanical bypass switches 60, 62, 64.

In an alternative, preferred embodiment illustrated in FIG. 3, mechanical bypass switches 60, 62, 64 are not subject to electronic control, but rather are limited to manual actuation, for example by manual switch 100 that is manually thrown, as will be described below. In that embodiment control line 66 is not present or not used.

Figure 3:
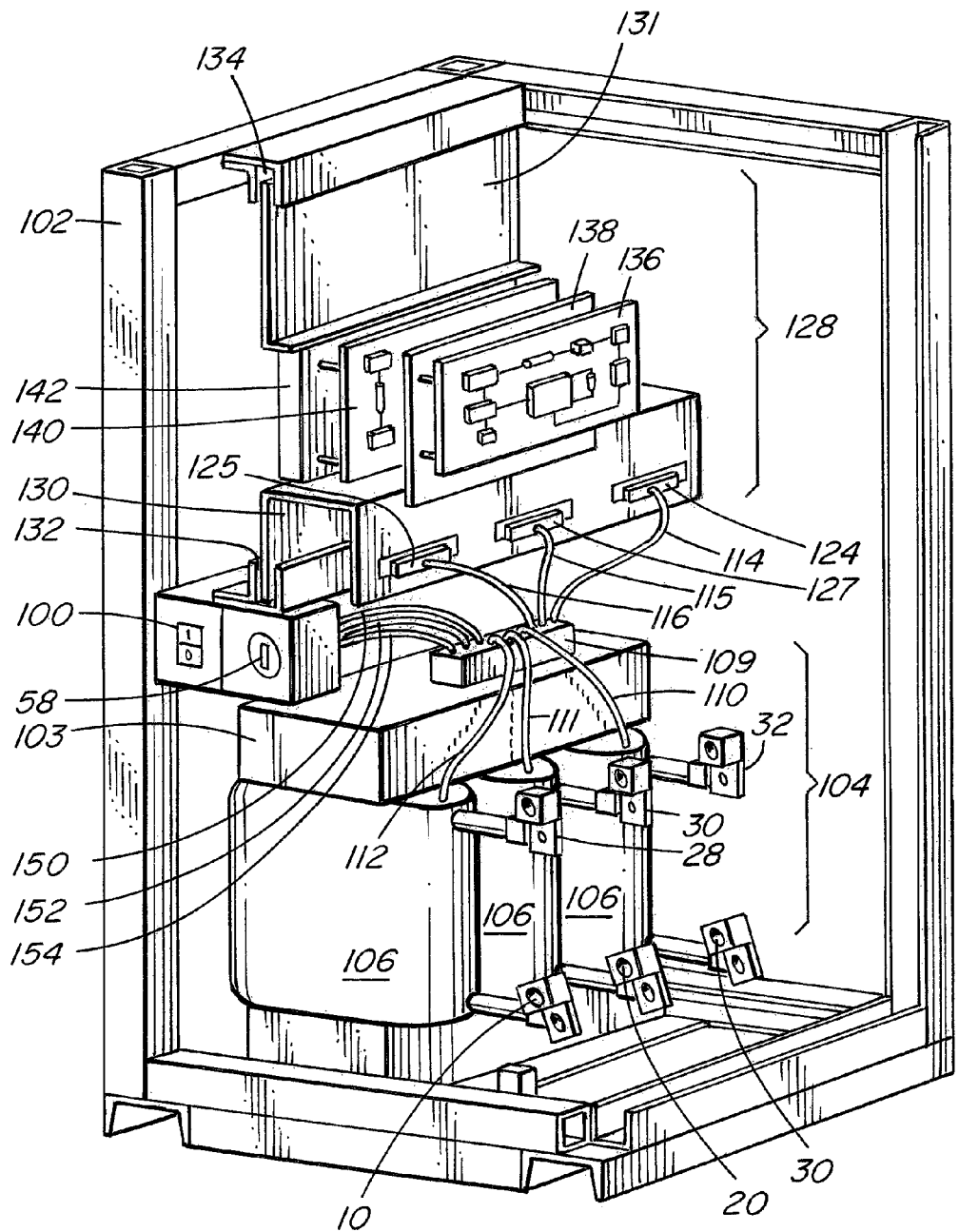
FIG. 3 is a perspective view of a regulator according to the preferred embodiment as mounted in a housing for implementing the preferred embodiment of the invention.

Referring generally to FIG. 3, the voltage regulator is embodied in a frame 102. A magnetics assembly 104 includes the windings 106, mains power input terminals 1Φ, 2Φ, 3Φ, facility input terminals 28, 30, 32, a core 103, a manual trigger 58, a manual switch 100, a terminal box 109 and 18 tap-shorting leads (two leads per tap, three taps per phase winding, three phase windings) shown as bundles 110-112 that extend from the terminal box 109 to tap terminals on the respective windings.

An electronics package or sub-assembly 128 includes support plates 130, 131 that are slidably mounted in bottom and top channels 132, 134 that form part of the larger frame structure 102 that also accommodates the magnetics assembly 104. Channels 132, 134 act as guides for sliding the sub-assembly 128 from the housing. This arrangement allows the electronics sub-assembly 128 to be disconnected and physically removed from the magnetics assembly 104 and from frame structure 102.

The control module 47 is implemented on a circuit board 136 that is mounted on a plate 138. The tap selector switches 46, 48, 50 and the electronic bypass switches 52, 54, 56 are implemented on a separate switch circuit board 140 that is mounted on a plate 142. The tap selector switches and electronic by-pass switches are implemented on switch circuit board 140 that is distinct from the circuit board 136 on which the control module 47 is implemented. This allows modularity between the two boards. Support plates 130, 131, plates 138, 142, control module 47 on circuit board 136, and tap selector switches 46, 48 and 50 and electronic bypass switches 52, 54, 56 on switch board 140 together form the electronics sub-assembly 128. When sub-assembly 128 is installed in frame 102 and is attached to the magnetics assembly 104, they are in electrical communication as illustrated in FIG. 1. In FIG. 1, the physically removable electronics sub-assembly 128 is identified by dotted lines.

Electronics sub-assembly 128 is in electrical communication with the magnetics assembly 104 through terminal box 109 and 18 leads extending from the switch circuit board 140 to plug-in connectors 125, 127, 129 and from those plug-in connectors to the terminal box 109. The 18 leads from the plug-in connectors are shown in FIG. 3 as three bundles 114-116. As also seen in FIG. 3, the terminal box 109 provides termination between the leads 114-116 and the tap-shorting leads 110-112.

Manual mechanical by-pass switch 100 is adapted to close contacts between leads 150, 152, 154 that are hard wired to extend from the switch 100 to terminal box 109 and tap-shorting leads 110-112. The circuit comprising manual switch 100, leads 150, 152, 154, terminal box 109, and tap shorting leads 110-112 is entirely included in the magnetics assembly 104 such that removal of the electronics sub-assembly 128 from the magnetics assembly 104 will not interrupt the tap-shorting closed circuit between them when the closed circuit is established.

Figure 4:
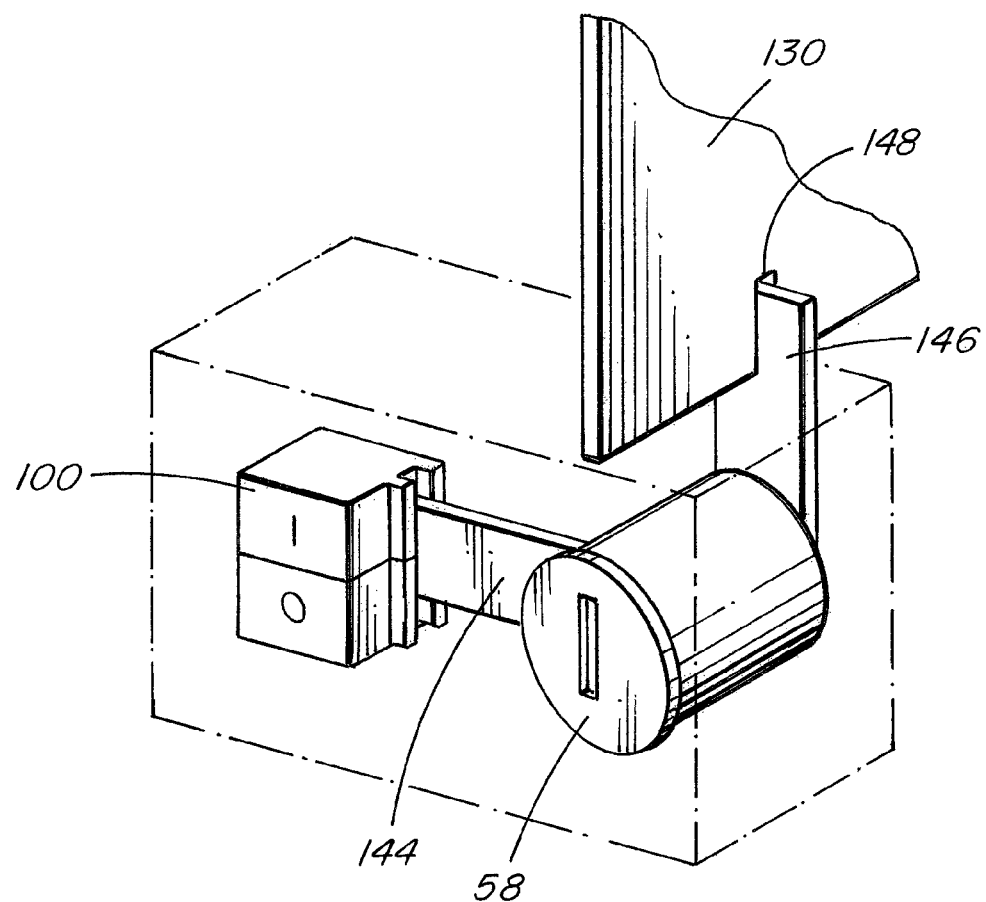
FIG. 4 is a perspective view of the key trigger failsafe mechanism according to the preferred embodiment; and, FIG. 5 is a side elevation of the electronics package according to the preferred embodiment.
Figure 5:
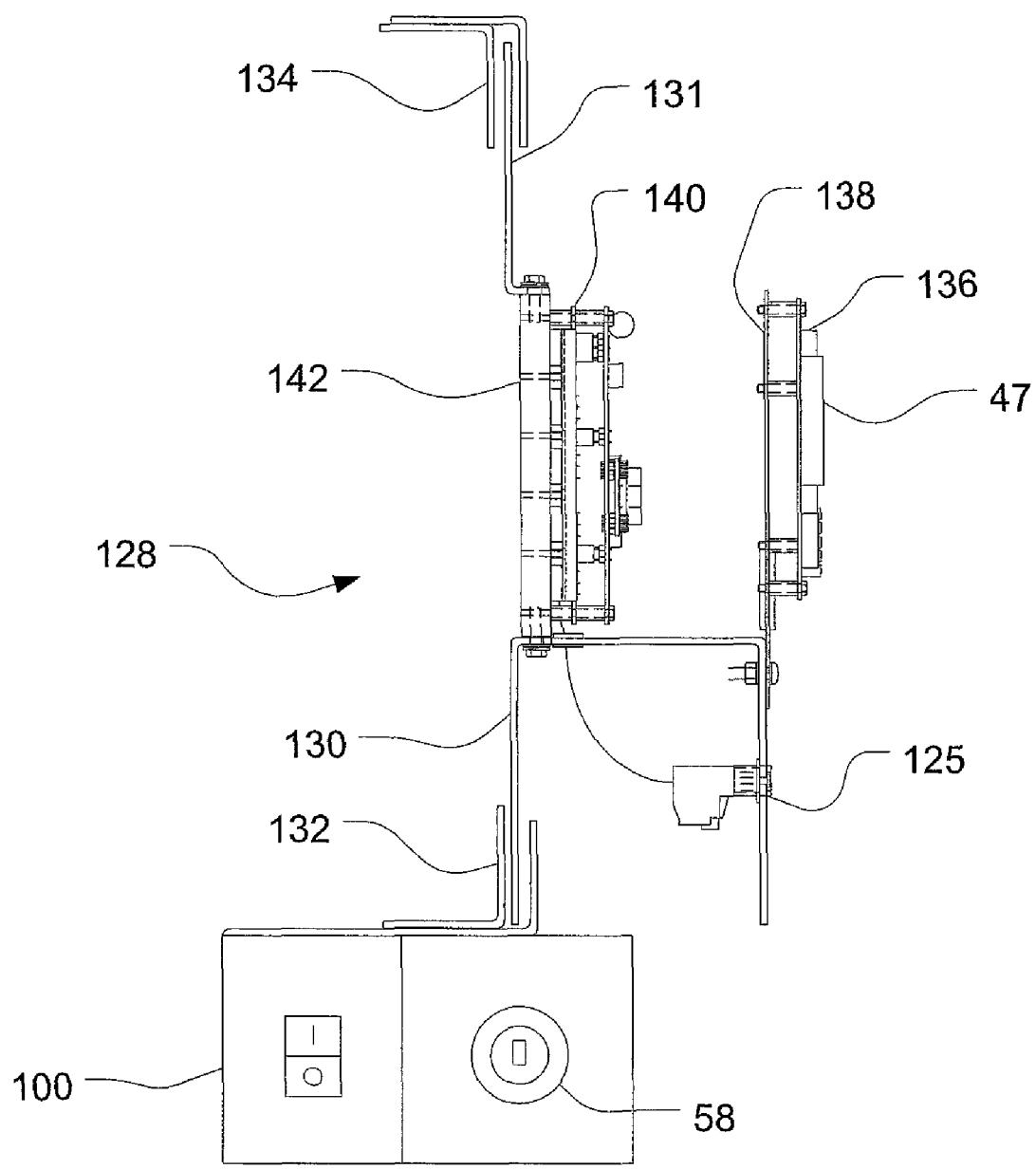

Key trigger 58 consists of a key that, when turned ON, signals the control module 47 to cause the electronic bypass switches 52, 54, 56 to close. The connection between key trigger 58 and control module 47 is by a plug-in connector (not shown) to board 136. Referring to FIG. 4 trigger 58 also comprises two latch bars 144, 146. When the key trigger 58 is turned OFF, latch bar 144 presents a physical obstruction to manual trigger 100 being thrown to the ON position while latch bar 146 engages a slot 148 in plate 130 thereby preventing the electronics sub-assembly 128 from being slid out along channel 132. This fail-safe arrangement restrains the electronics sub-assembly 128 from being slid out from its seat in channel 132 unless the electronic bypass switches have been closed, and also prevents the closing of the mechanical bypass switches until the electronic bypass switches have first been closed.

The method of operation of the preferred and alternative embodiments will now be described.

In normal regulator operation, control module 47 monitors the voltage at mains power input terminals 22, 24, 26 to identify overvoltage situations. Based on the desired nominal voltage and taking into account acceptable facility voltage levels, control module 47 operates tap selector switches 46, 48, 50 so as to select between taps 40, 42, 44 (for the first phase, and corresponding taps for the other phases), resulting in voltage step downs of 6%, 4% or 2% (in the preferred embodiment). Control module is continuously active to automatically regulate the voltage output of the transformer as presented to the facility voltage input terminals 28, 30, 32.

When it is desired to remove the electronics package 128 from the circuit for maintenance, replacement or repair, key trigger 58 is manually turned to the ON position by the operator signaling control module 47 to actuate the electronic bypass switches 52, 54, 56. Control module 47 controls the timing of the closing of the electronic bypass switches and signals the switch circuit board 140 to close the circuit across the leads 114-116 to terminal box 109 and to the tap-shorting leads 110-112. This provides an effective electrical short-circuit across the primary windings between the mains power supply and the facility input terminals.

The turning of trigger 58 to the ON position also releases the manual switch 100 to be thrown to the ON position. The operator then throws the manual switch 100 to the ON position thereby mechanically closing the tap-shorting circuit through 18 leads (shown as bundles 117, 119, 121) extending from the switch 100 to the terminal box 109. This mechanically switched by-pass short-circuit is separate from and provided in parallel to the short-circuit established electronically by switch circuit board 140 and leads 114-116 such that the opening of the electronic short-circuit caused by disconnecting leads 114-116 from the electronics sub-assembly 128 does not open circuit the taps.

The turning of key trigger 58 to the ON position also retracts latch bar 146 from slot 148 in plate 130. The electronics sub-assembly 128 may then be slid along channels 132, 134 and removed from the frame 102. Before doing so, leads 114-116 are unplugged from the plug-in connectors associated with switch circuit board 140 as well as the plug-in connector from trigger 58 to control module 47.

In the foregoing embodiment, we have described a fail-safe system that relies on a key trigger and latch bars to enable the closing of the mechanical switch and the removal of the electronics sub-assembly only after the electronic bypass switches have been closed. An alternative fail-safe approach is also contemplated whereby the closing of the electronic bypass switches also electrically closes a fail-safe interrupter switch. The interrupter switch acts to both release a latch restraining the plate 130 and to close a normally closed relay that provides continuity to manual switch 100. Thus the closing of the interrupter switch is required to allow closing of the mechanical switch by means of switch 100 and to allow physical removal of the electronics sub-assembly. Disconnection of the electronics sub-assembly 128 from the interrupter switch will leave the normally closed relay in the closed position.

It will be appreciated that various details of the preferred and alternative embodiments of the invention have been described herein. However, the scope of the invention as claimed is to be determined by the following claims, the scope of the claims necessarily allowing for variations and substitutions of functional equivalents in relation to the described embodiments.

The invention claimed is:

1. A tap-switching autotransformer adapted to be interposed between a utility power supply and a facility for regulating the voltage supplied to said facility comprising:
    an electronics sub-assembly for automatically controlling switching of the taps to control an output voltage from said autotransformer;
    a housing for holding said electronics sub-assembly and at least one winding;
    said electronics sub-assembly being removable from said housing for repair or replacement;
    said electronics sub-assembly being adapted to enable an electronically-actuated short-circuit between two of said taps; and,
    a mechanical by-pass switch enabling a mechanically-actuated short-circuit to be maintained between the taps, said mechanically-actuated short-circuit being separate from said electronically-actuated short-circuit, enabling said electronics sub-assembly to be safely removed from said housing.

2. The autotransformer of claim 1 further comprising a plug-in receptacle for selectively attaching an electrical cable between said winding and said electronics sub-assembly.

3. An autotransformer-style voltage regulator comprising a housing, at least one winding, a plurality of taps on said winding and electronic control elements for automatically selecting among said taps, wherein:
    said electronic control elements are mounted in an electronics sub-assembly; and,
    said electronics sub-assembly is adapted to be removed from and replaced into said housing.

4. The voltage regulator of claim 3 wherein said electronics sub-assembly is mounted on guides such that the electronics sub-assembly can be removed from said housing by sliding said electronics sub-assembly along said guides.

* * * * *